United States Patent
Kesselgruber et al.

(10) Patent No.: US 7,322,589 B2
(45) Date of Patent: Jan. 29, 2008

(54) STABILIZER ASSEMBLY FOR A MOTOR VEHICLE

(75) Inventors: Dirk Kesselgruber, Köln (DE); Martin Boecker, Korschenbroich (DE)

(73) Assignee: TRW Automotive GmbH (DE)

( * ) Notice: Subject to any disclaimer, the term of this patent is extended or adjusted under 35 U.S.C. 154(b) by 330 days.

(21) Appl. No.: 10/924,732

(22) Filed: Aug. 24, 2004

(65) Prior Publication Data

US 2005/0218619 A1     Oct. 6, 2005

(30) Foreign Application Priority Data

Aug. 25, 2003   (DE)   ............ 203 13 102 U

(51) Int. Cl.
*B60G 21/055* (2006.01)

(52) U.S. Cl. ............... 280/124.106; 280/280; 280/124.107; 280/5.511

(58) Field of Classification Search ......... 280/124.106, 280/124.107, 5.506, 5.511, 124.167, 124.152
See application file for complete search history.

(56) References Cited

U.S. PATENT DOCUMENTS

| | | | | |
|---|---|---|---|---|
| 3,396,984 A | * | 8/1968 | Cadiou | ............... 280/5.509 |
| 3,820,812 A | * | 6/1974 | Stubbs et al. | ............ 280/5.506 |
| 4,844,506 A | * | 7/1989 | Moriguchi et al. | ........ 280/5.51 |
| 4,919,441 A | * | 4/1990 | Marier et al. | ............... 280/21.1 |
| 5,362,094 A | | 11/1994 | Jensen | |
| 5,735,540 A | * | 4/1998 | Schiffler | ............... 280/5.501 |
| 6,022,030 A | | 2/2000 | Fehring | |
| 6,390,484 B1 | * | 5/2002 | Green et al. | .......... 280/124.106 |
| 6,428,019 B1 | * | 8/2002 | Kincad et al. | ........... 280/5.511 |
| 6,454,284 B1 | * | 9/2002 | Worman, Jr. | ......... 280/124.167 |
| 2004/0217568 A1 | * | 11/2004 | Gradu | ............... 280/124.107 |

FOREIGN PATENT DOCUMENTS

| | | |
|---|---|---|
| DE | 2 060 025 | 6/1972 |
| DE | 42 37 708 | 1/1994 |
| DE | 44 43 809 | 4/1996 |
| DE | 37 05 520 | 8/1996 |
| DE | 693 02 712 | 9/1996 |
| DE | 195 13 467 | 10/1996 |
| EP | 0 152 914 | 8/1985 |
| EP | 0 555 119 | 8/1993 |
| GB | 2 006 131 | 5/1979 |
| WO | 03/045719 | 6/2003 |

\* cited by examiner

*Primary Examiner*—Paul N. Dickson
*Assistant Examiner*—Drew J. Brown
(74) *Attorney, Agent, or Firm*—MacMillan, Sobanski & Todd, LLC

(57) ABSTRACT

A stabilizer assembly for a motor vehicle, including a first stabilizer and a second stabilizer, which are rotatable relative to each other, is characterized in that each stabilizer is engaged by one linear actuator each.

13 Claims, 3 Drawing Sheets

STABILIZER ASSEMBLY FOR A MOTOR VEHICLE

CROSS REFERENCE TO RELATED APPLICATION

This application claims priority to German Application No. 203 13 102.9 filed Aug. 25, 2003, the disclosures of which are incorporated herein by reference.

BACKGROUND OF THE INVENTION

The invention relates to a stabilizer assembly for a motor vehicle, comprising a first stabilizer and a second stabilizer, which are rotatable relative to each other.

Such stabilizer assemblies are used in active chassis to suppress or control the rolling movements of the vehicle body when driving around bends. Here, the two stabilizers are rotated or pre-stressed with respect to each other hydraulically, mechanically or electromechanically as a function of the driving condition. DE 44 43 809 A1 describes for example such an assembly, in which the ends of the two stabilizers can be braced with respect to each other by means of a hydraulic rotary drive. Such rotary drives must be produced with close tolerances and be sealed in a costly manner. They are therefore expensive. In addition, in operation, they are relatively intensive as regards maintenance, and susceptible to problems. In order to apply the necessary torque, the rotary drives must also be sufficiently dimensioned, the weight of the rotary drives having to be additionally received by the bearing of the stabilizers.

SUMMARY OF THE INVENTION

The invention provides a simple and favorably-priced stabilizer assembly.

For this purpose, in a stabilizer assembly of the type initially mentioned, provision is made that each stabilizer is engaged by one linear actuator each. Linear actuators are standard components which, owing to their simple construction, operate reliably and are available at a favorable cost.

Other advantages of this invention will become apparent to those skilled in the art from the following detailed description of the preferred embodiment, when read in light of the accompanying drawings.

Further embodiments will be apparent from the following detailed description of the invention.

DETAILED DESCRIPTION OF THE INVENTION

Figure 1:
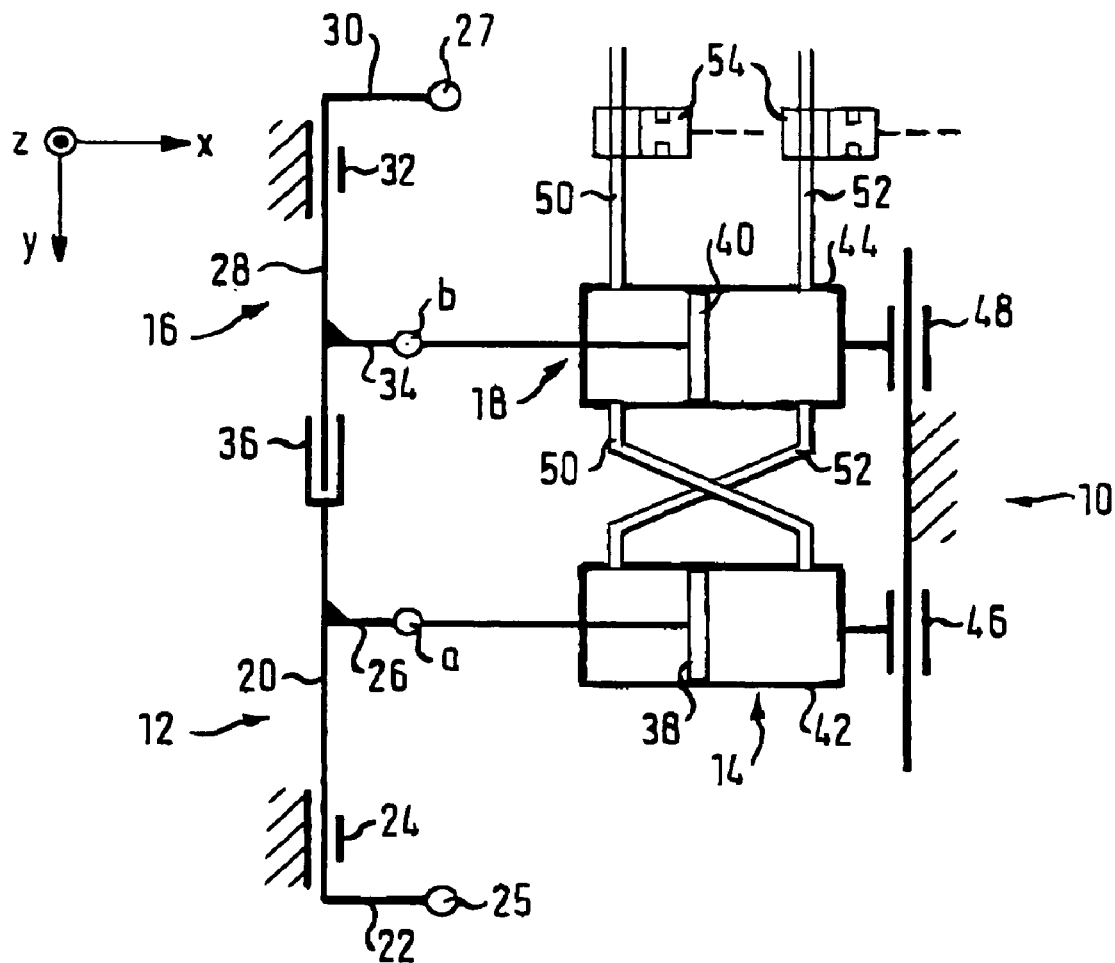
FIG. 1 shows a diagrammatic view of a first embodiment of the assembly according to the invention, in a first plane.

In FIG. 1 a stabilizer assembly 10 is diagrammatically illustrated, comprising a first stabilizer 12, which is engaged by a first linear actuator 14, and a second stabilizer 16, which is engaged by a second linear actuator 18. The illustrated view extends in an x-y plane, an x designating an axis which corresponds to the longitudinal axis of the vehicle when the assembly 10 is incorporated in a vehicle. Accordingly, an axis corresponding to the transverse axis of the vehicle is designated by y, and an axis corresponding to the vertical axis is designated by z.

The first stabilizer 12 consists of a torsion rod part 20 and a crank arm part 22. At the free end of the crank arm part 22, a joint 25 can be provided, with which the stabilizer 12 can engage the chassis of a vehicle, for example the transverse steering arrangements or the wheel carrier. The torsion rod part 20 is mounted in a bearing 24 so as to be rotatable about its longitudinal axis extending in the y-direction, for example on the vehicle body. On the torsion rod part 20, an adjustment lever arm 26 is provided, with which a torque can be exerted about the longitudinal axis of the torsion rod part 20. By variation of the length of the adjustment lever arm, and by selection of actuator force and actuator adjustment distance, an optimum coordination can be achieved between torque and reaction time of the assembly. It would also be conceivable for the actuator 14 to engage the crank arm part 22. However, the illustrated arrangement has certain advantages compared with this: Firstly, the structural space is generally very restricted in the region of the wheel carrier, so that there is no space left there to house an additional actuator. Secondly, in this arrangement advantageously the elastic torsional capability of the torsion rod part 20 can be utilized.

In the same way, the second stabilizer 16 is constructed from a crank arm part 30 and a torsion rod part 28 with an adjustment lever arm 34, the torsion rod part 28 being mounted in a bearing 32. The torsion rod parts 20 and 28 of the two stabilizers 12, 16 are arranged along a shared longitudinal axis and are rotatably connected with each other by a joint 36.

The two actuators 14 and 18 are illustrated diagrammatically as hydraulic cylinders with piston 38 or 40 and cylinder body 42 or 44. However, the use of other types of actuators which operate linearly is also conceivable. The piston 38 of the first actuator 14 engages the adjustment lever arm 26 of the first stabilizer 12, so that on actuation of the first actuator 14, a torque can be exerted about the y-axis. In the same way, the piston 40 of the second actuator 18 engages the second stabilizer 16. The cylinder bodies 42 and 44 are fastened, in turn, rotatably to the vehicle body or to the axle carrier by means of bearings 46 and 48, respectively.

Figure 2:
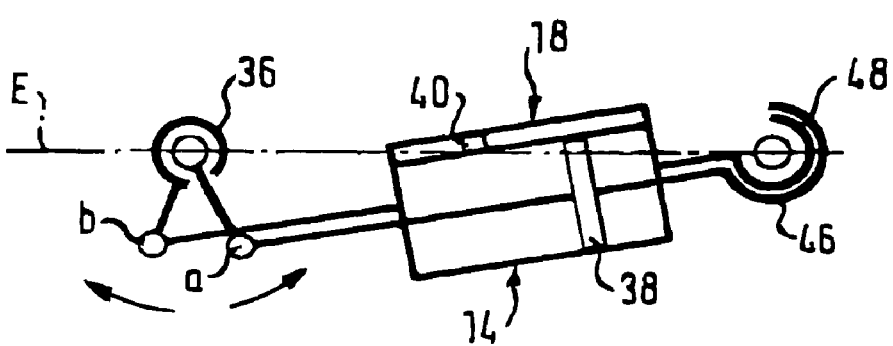
FIG. 2 shows a diagrammatic view of the assembly of FIG. 1 in a second plane.

The longitudinal axis of the torsion rod parts 20 and 28, together with the rotation axis of the bearings 24 and 32, sets a plane E, which as in the present illustration may extend parallel to the x-y plane or to the plane of the drawing of FIG. 1. As can be seen in FIG. 2, the engagement point a of the piston 38 on the adjustment lever arm 26 lies on the same side of the plane E as the engagement point b of the piston 40 on the adjustment lever arm 34 of the second stabilizer 16. This arrangement causes the two stabilizers 12 and 16 to be turned mutually in relation to each other when the actuators 14, 18 act in opposition.

The actuators 14, 18 can be driven jointly via connecting lines 50, 52, the connections being connected crosswise so that the two actuators operate oppositely upon one of the two connecting lines 50, 52 being acted on. This means that when, for example, the line 50 is acted upon, the piston 38 of the first actuator 14 moves out from the cylinder body 42, i.e. moves to the left in FIGS. 1 and 2. Thereby, the first stabilizer 12 undergoes a torque which acts in an anticlockwise direction in FIG. 2. The piston 40 of the second actuator 18, on the other hand, moves into the cylinder body 44, therefore moves to the right, so that the second stabilizer 16 undergoes a torque directed in an anticlockwise direction. Thereby, the two stabilizers 12 and 16 are turned in opposite directions. In this way, an active stabilizer force can be introduced into the chassis, for example in order to carry out a rolling moment or to balance out a rolling moment acting from the exterior onto the vehicle.

Advantageously, provision may be made additionally that the connecting lines 50, 52 can be blocked for example by means of an optional control valve 54. Thereby, the inflow and outflow between the actuators and a pressure source (not shown) is interrupted, but not the pressure equalization between the two actuators. The two actuators 14, 18 are therefore rigidly coupled, so that the assembly 10, comparable with a mechanical coupling in the joint 36, behaves like a conventional stabilizer. This can be desired, for example, in a breakdown in the control system of an active rolling stabilization.

Figure 3:
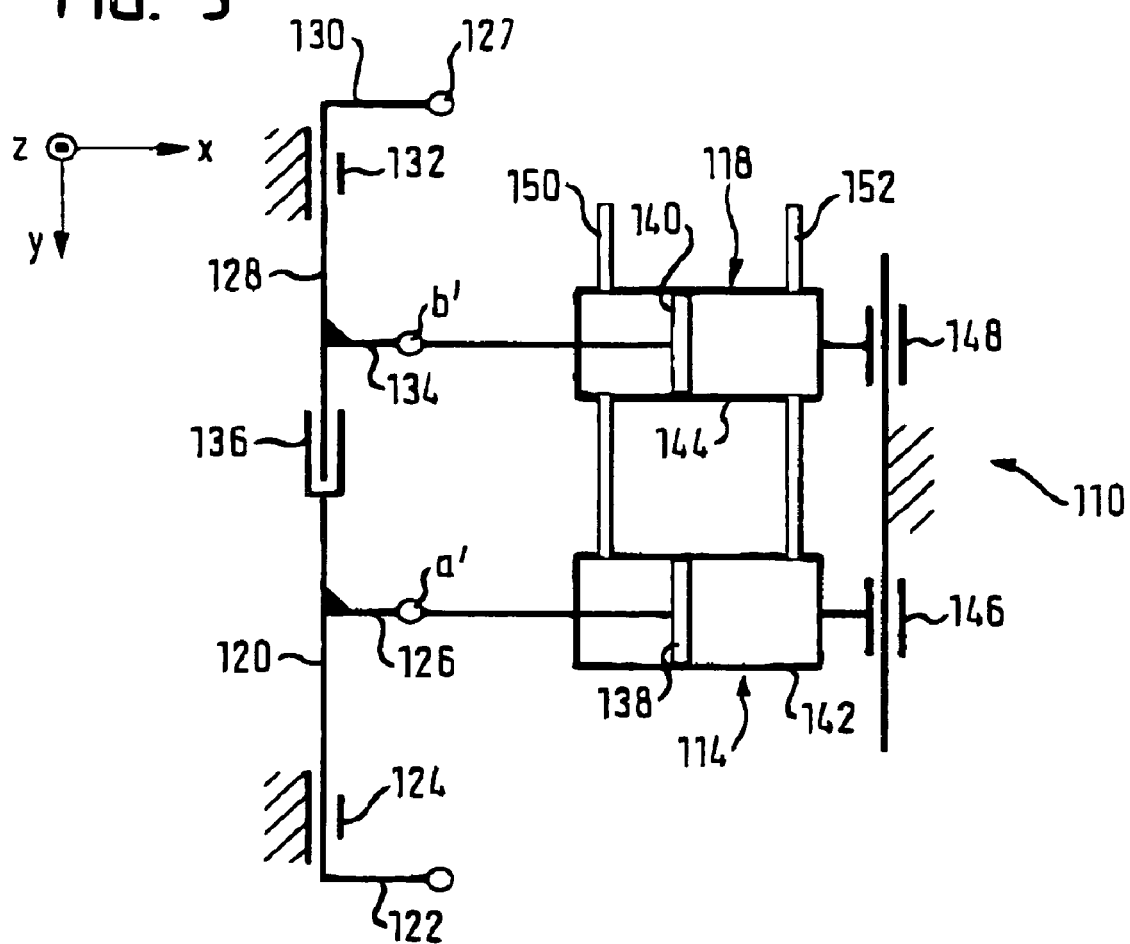
FIG. 3 shows a diagrammatic view of an assembly according to a second embodiment of the invention in a first plane.
Figure 4:
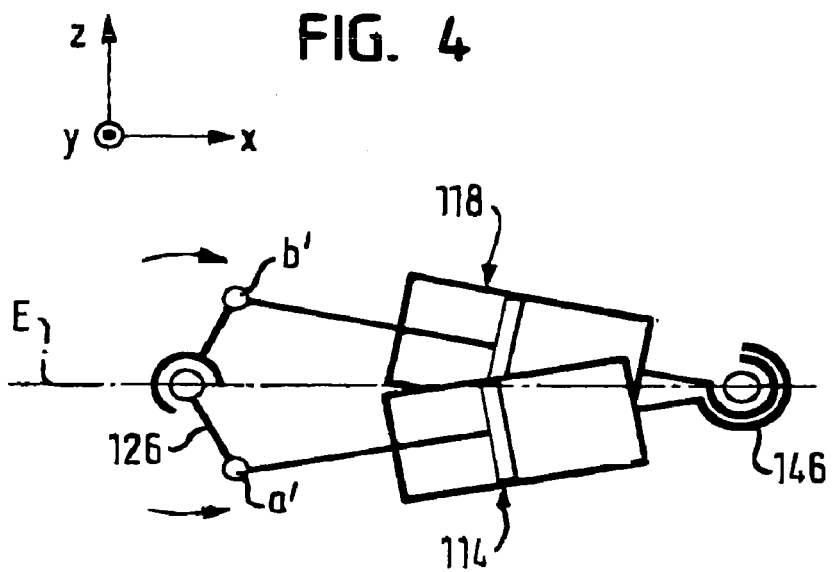
FIG. 4 shows a diagrammatic view of the assembly of FIG. 3 in a second plane.

In FIGS. 3 and 4, a second embodiment of the invention is illustrated, in which reference numbers increased by 100 are used for components which are already known. In this second embodiment, the two actuators 114 and 118 are connected in parallel, so that when the connecting lines 150 or 152 are acted upon, they act in the same direction. This means that when, for example, the connecting line 150 is acted upon, the pistons 138 and 140 of the two actuators move to the right in the Figures.

The engagement point a' of the piston 138 on the adjustment lever arm 126 and the engagement point b' of the piston rod 140 on the adjustment lever arm 134, however, in contrast to the first embodiment, are not situated on the same, but on opposite sides of the plane E'. This arrangement brings it about that when pistons 138 and 140, respectively of actuators 114 and 118 act in the same direction, e.g. to the left, nevertheless opposed torques are exerted on the torsion rod parts 120 and 128, and therefore the two stabilizers 112 and 116 are turned mutually in relation to each other.

Figure 5:
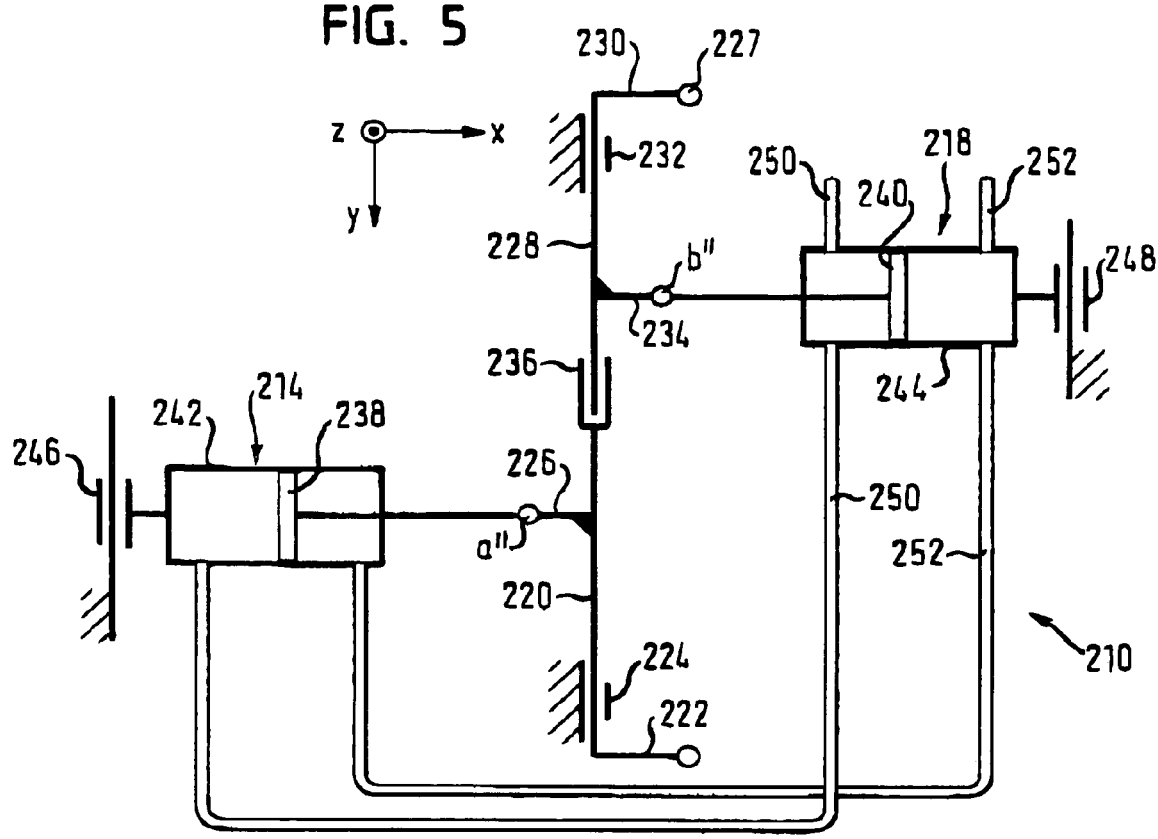
FIG. 5 shows a diagrammatic view of an assembly according to a third embodiment of the invention in a first plane.
Figure 6:
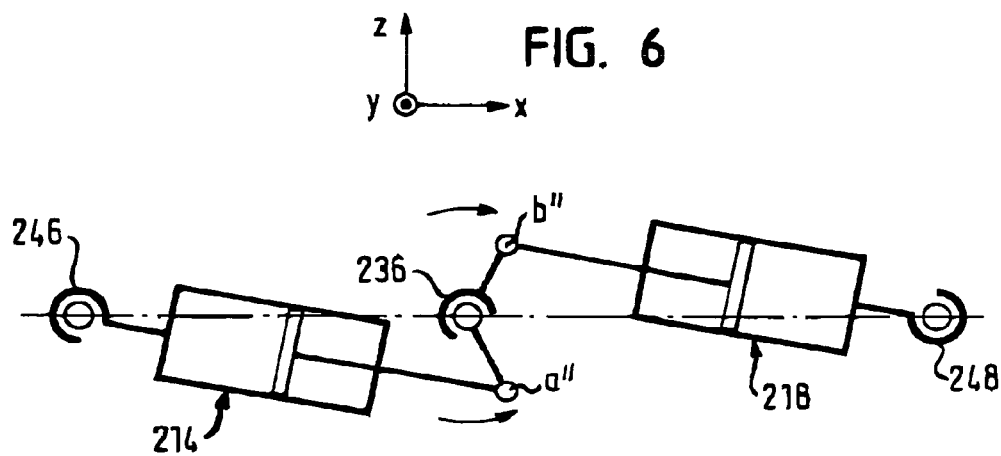
FIG. 6 shows a diagrammatic view of the assembly of FIG. 5 in a second plane.

According to a further embodiment, which is illustrated by way of example in FIGS. 5 and 6, the actuators 214 and 218 can also be arranged on opposite sides with respect to the longitudinal axis of the torsion rod parts 220, 228. This can be advantageous, if the structural space in the region of the rear axle is limited. In this way, the arrangement of the actuators can be varied in a flexible manner. The connecting of the actuators, whether in the same or opposite direction, is again dependent here on the arrangement of the engagement points a'', b'' with respect to the plane E''.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A stabilizer assembly for a motor vehicle, comprising:
   a first stabilizer,
   a separate second stabilizer engaging said first stabilizer such that said first and second stabilizers are rotatable relative to each other, and
   first and second linear actuators, said actuators engaging one stabilizer each, said first and second linear actuators being hydraulic cylinders connected crosswise.

2. The stabilizer assembly according to claim 1, wherein a control valve is provided, which can block the inflow and outflow of the two linear actuators, so that the two stabilizers are coupled rigidly with each other.

3. A stabilizer assembly for a motor vehicle, comprising:
   a first stabilizer, and
   a second stabilizer separate from said first stabilizer, said second stabilizer bar engaging said first stabilizer bar for rotation relative to each other, wherein said first stabilizer and said second stabilizer engage each other for support relative to one another,
   a first linear actuator engaging said first stabilizer, and
   a second linear actuator engaging said second stabilizer.

4. The stabilizer assembly according to claim 3, wherein said first stabilizer has a first longitudinal axis and said first linear actuator engages said first stabilizer so as to cause rotation of said first stabilizer about said first longitudinal axis; and
   said second stabilizer has a second longitudinal axis and said second linear actuator engages said second stabilizer so as to cause rotation of said second stabilizer about said second longitudinal axis.

5. The stabilizer assembly of claim 4 wherein the first and second longitudinal axes are substantially aligned.

6. The stabilizer of claim 5 including at least one control valve for operating the first and second linear actuators in a desired manner.

7. The stabilizer assembly according to claim 3, wherein said first stabilizer and said second stabilizer are arranged along a shared longitudinal axis.

8. A stabilizer assembly for a motor vehicle, comprising;
   a first stabilizer,
   a separate second stabilizer engaging said first stabilizer such that said first and second stabilizers are rotatable relative to each other, and
   first and second linear actuators, said actuators engaging one stabilizer each, wherein the first and second stabilizers are rotatably connected with each other by a joint.

9. A stabilizer assembly for a motor vehicle, comprising:
   a first stabilizer, and
   a second stabilizer separate from said first stabilizer, said second stabilizer bar engaging said first stabilizer bar for rotation relative to each other, wherein said first stabilizer and said second stabilizer are rotatably connected by a joint,
   a first linear actuator engaging said first stabilizer, and
   a second linear actuator engaging said second stabilizer.

10. The stabilizer assembly according to claim 9, wherein said first stabilizer and said second stabilizer are arranged along a shared longitudinal axis.

11. The stabilizer assembly according to claim 9, wherein said first stabilizer has a first longitudinal axis and said first linear actuator engages said first stabilizer so as to cause rotation of said first stabilizer about said first longitudinal axis; and
    said second stabilizer has a second longitudinal axis and said second linear actuator engages said second stabilizer so as to cause rotation of said second stabilizer about said second longitudinal axis.

12. The stabilizer assembly of claim 11 wherein the first and second longitudinal axes are substantially aligned.

13. The stabilizer assembly of claim 12 including at least one control valve for operating the first and second linear actuators in a desired manner.

* * * * *